US008705845B2

(12) United States Patent
Doucet et al.

(10) Patent No.: US 8,705,845 B2
(45) Date of Patent: Apr. 22, 2014

(54) ENTERTAINMENT DEVICE AND METHOD OF INTERACTION

(75) Inventors: Nicolas Doucet, London (GB); Nathan James Baseley, London (GB)

(73) Assignee: Sony Computer Entertainment Europe Limited (GB)

( * ) Notice: Subject to any disclaimer, the term of this patent is extended or adjusted under 35 U.S.C. 154(b) by 377 days.

(21) Appl. No.: 13/059,757

(22) PCT Filed: Apr. 29, 2009

(86) PCT No.: PCT/GB2009/001086
§ 371 (c)(1),
(2), (4) Date: Jun. 14, 2011

(87) PCT Pub. No.: WO2010/020739
PCT Pub. Date: Feb. 25, 2010

(65) Prior Publication Data
US 2011/0237331 A1      Sep. 29, 2011

(30) Foreign Application Priority Data

Aug. 19, 2008   (EP) .................................... 08252735

(51) Int. Cl.
*G06K 9/00*          (2006.01)
(52) U.S. Cl.
USPC ............ 382/154; 345/419; 382/187; 382/203
(58) Field of Classification Search
USPC .............. 345/419, 473, 589; 382/154; 463/32
See application file for complete search history.

(56) References Cited

U.S. PATENT DOCUMENTS

| 6,459,809 B1 * | 10/2002 | Jensen et al. .................. 382/203 |
| 7,034,832 B2 * | 4/2006 | Yamauchi et al. ............. 345/473 |
| 7,202,874 B2 * | 4/2007 | Yamaguchi et al. .......... 345/589 |
| 7,327,359 B2 * | 2/2008 | Nagayama et al. ........... 345/419 |
| 7,379,599 B1 * | 5/2008 | Blais-Morin et al. ......... 382/217 |
| 7,539,606 B2 * | 5/2009 | Comair et al. .................... 703/9 |
| 7,574,045 B2 * | 8/2009 | Simon et al. ................... 382/181 |
| 2005/0248562 A1 * | 11/2005 | Maystrovsky et al. ........ 345/419 |
| 2006/0073892 A1 | 4/2006 | Watanabe et al. |
| 2009/0138805 A1 * | 5/2009 | Hildreth ........................ 715/745 |
| 2011/0237331 A1 * | 9/2011 | Doucet et al. ................... 463/32 |

FOREIGN PATENT DOCUMENTS

EP    1672470 A2    6/2006

OTHER PUBLICATIONS

European Search Report, EP 08252735, dated Jan. 28, 2009.
International Preliminary Report on Patentability, PCT/GB2009/001086, dated Aug. 12, 2010.
International Search Report and Written Opinion, PCT/GB2009/001086, dated Jul. 21, 2009.

(Continued)

*Primary Examiner* — Gregory M Desire
(74) *Attorney, Agent, or Firm* — Lerner, David, Littenberg, Krumholz & Mentlik, LLP

(57) ABSTRACT

A method of interaction for an augmented reality environment comprises the steps of capturing an image of a drawn picture comprising one or more drawn shapes, identifying the or each respective drawn shape as corresponding to a component of an archetypal model and generating a three dimensional virtual model representing the archetypal model using generation rules associated with the archetypal model, wherein components of the three dimensional virtual model generated from components of the archetypal model corresponding to the or each respective drawn shape have the appearance of the or each respective drawn shape.

15 Claims, 9 Drawing Sheets

(56) References Cited

OTHER PUBLICATIONS

Ellen Yi-Luen Do: "VR Sketchpad" CAAD Futures 2001, Jul. 8, 2001-Jul. 11, 2001 pp. 161-172, XP002510732.

Christine J. Alvarado, Randall Davis: "Preserving the Freedom of Paper in a Computer-Based Sketch Tool" Proc. of HCI International, Aug. 5, 2001-Aug. 10, 2001 XP002510733.

Zeleznik R C et al: "Sketch: An Interface for Sketching 3D Scenes" Aug. 4, 1996, Computer Graphics Proceedings 1996 (SIGGRAPH). New Orleans, Aug. 4-9, 1996; [Computer Graphics Proceedings (SIGGRAPH)], New York, NY : ACM, US, pp. 163-170 , New Orleans , XP000682732.

Eggli L et al: "Sketching as a Solid Modeling Tool" May 17, 1995, Proceedings of the Third Symposium on Solid Modeling and Applications. Salt Lake City, May 17-19, 1995; [Proceedings of the Symposium on Solid Modeling and Applications], New York, ACM, US, pp. 313-321, Salt Lake City, XP000530131.

S. Tano, et. al.: "Godzi 11 a: Seamless 2D and 3D Sketch Environment for Reflective and Creative Design Work" Human-Computer Interaction—Interact 03, Sep. 1, 2003-Sep. 5, 2003 pp. 311-318, XP002510734.

\* cited by examiner

ENTERTAINMENT DEVICE AND METHOD OF INTERACTION

CROSS REFERENCE TO RELATED APPLICATIONS

The present application is a national phase entry under 35 U.S.C. §371 of International Application No. PCT/GB2009/001086 filed Apr. 29, 2009, published in English, which claims the benefit of and priority to EP Patent Application No. 08252735.9, filed Aug. 19, 2008, the entire disclosures of which are hereby incorporated by reference herein.

The present invention relates to an entertainment device and a method of interaction.

Recently, with the advent of ever more powerful computers, real time tracking of objects using a video camera has become more achievable. Furthermore, such systems may be used to combine real images with virtual images so as to generate augmented reality images and produce a content-rich media experience for a user.

Augmented reality is increasingly being used in video game systems. For example, a video game called "The Eye of Judgement" published by Sony Computer Entertainment® uses a system where game cards may be detected by a video camera and augmented reality images generated such that game creatures may be displayed superimposed on the detected game cards. However, once a game card has been played, such systems may offer little additional real-time interaction.

Meanwhile, highly interactive applications have recently been developed that allow users to generate objects that interact within a virtual environment. These can take the form of simply allowing users to assemble objects from a predefined array of elements, as in Garry's Mod (see http://en.wikipedia.org/wiki/Garry's_Mod), but can also take the form of calculating physical attributes for two-dimensional shapes drawn on screen by users, as in Crayon Physics Deluxe, (see for example http://www.youtube.com/watch?v=QsTqspnvAaI) or the Massachusetts Institute of Technology's Assist (see for example http://www.youtube.com/watch?v=NZNTgglP-bUA), or a combination of editable and predefined objects as in Umeå. University's Phun (see http://www.youtube.com/watch?v=0H5g9VS0ENM) or Sony's® Little Big Planet® (see http://www.youtube.com/watch?v=nuoOosTdFiY).

Thus it would be desirable to incorporate such interaction within augmented reality environments as well as simply virtual ones.

The present invention seeks to alleviate or mitigate the above problem.

In a first aspect, there is provided a method of interaction for an augmented reality environment comprising the steps of capturing an image of a drawn picture comprising one or more drawn shapes, identifying the or each respective drawn shape as corresponding to a component of an archetypal model and generating a three dimensional virtual model representing the archetypal model using generation rules associated with the archetypal model, wherein components of the three dimensional virtual model generated from components of the archetypal model corresponding to the or each respective drawn shape have the appearance of the or each respective drawn shape.

In another aspect, an entertainment device comprises a video input operable to receive video data, an image capturer operable to capture an image of a drawn picture comprising one or more drawn shapes from the video data, a shape identifier operable to identify the or each respective drawn shape as corresponding to a component of an archetypal model and a three dimensional modeller operable to generate a three dimensional virtual model representing the archetypal model using generation rules associated with the archetypal model wherein components of the three dimensional virtual model generated from components of the archetypal model corresponding to the or each respective drawn shape have the appearance of the or each respective drawn shape.

Advantageously, by capturing the user's drawing from video (for example from a video camera) and determining an archetypal object or model that the drawing represents, the drawing can then be transformed in to a three-dimensional object for inclusion within the augmented reality environment by use of specific transformation rules associated with the particular archetypal object, for example a car, an aeroplane, a flower or anything else.

Embodiments of the present invention will now be described by way of example with reference to the accompanying drawings, in which.

An entertainment device and a method of interaction are disclosed. In the following description, a number of specific details are presented in order to provide a thorough understanding of embodiments of the present invention. However, it will be apparent to a person skilled in the art that these specific details need not be employed to practise the present invention. Conversely, specific details known to the person skilled in the art are omitted for the purposes of clarity in presenting the embodiments.

Figure 1:
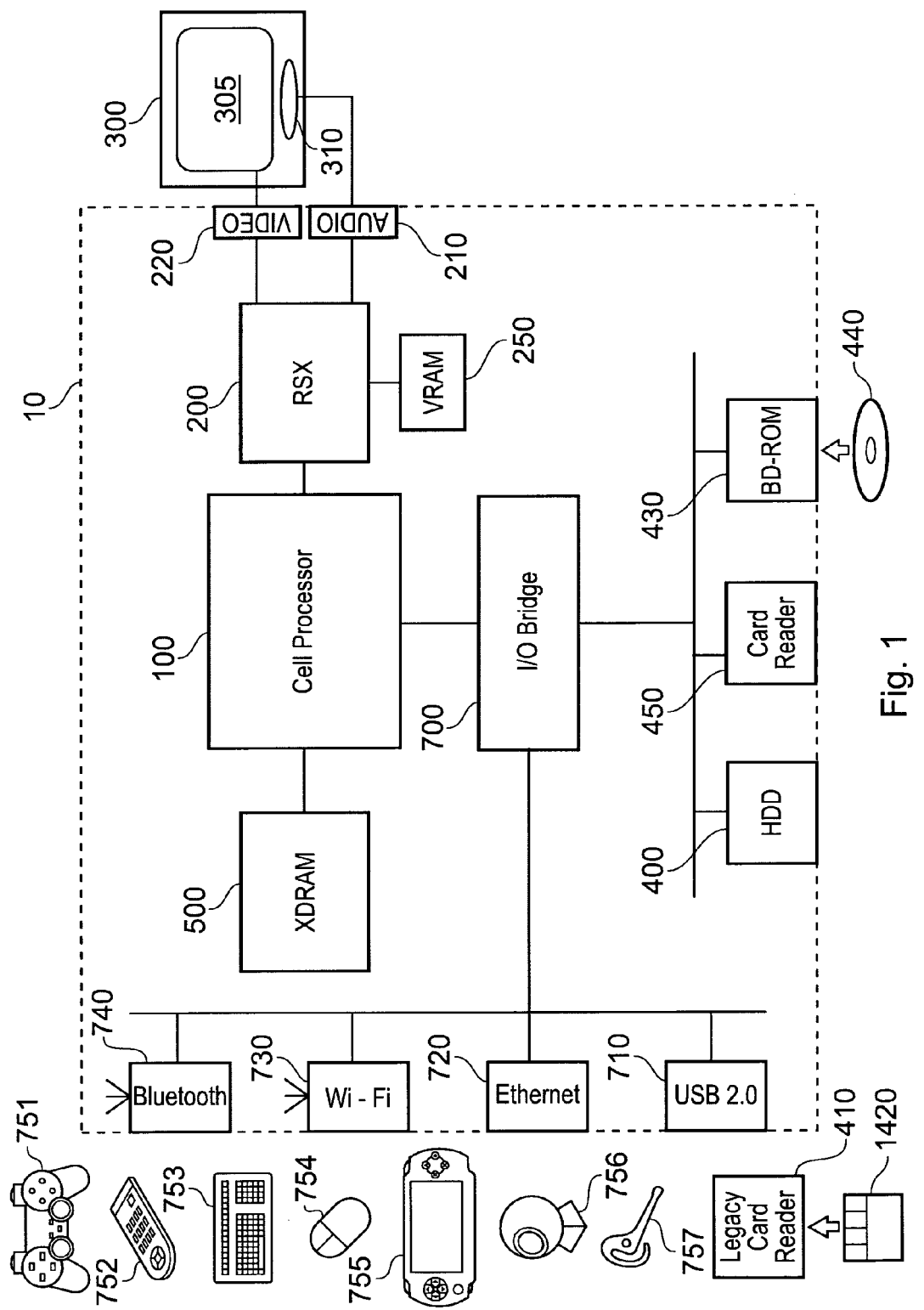
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
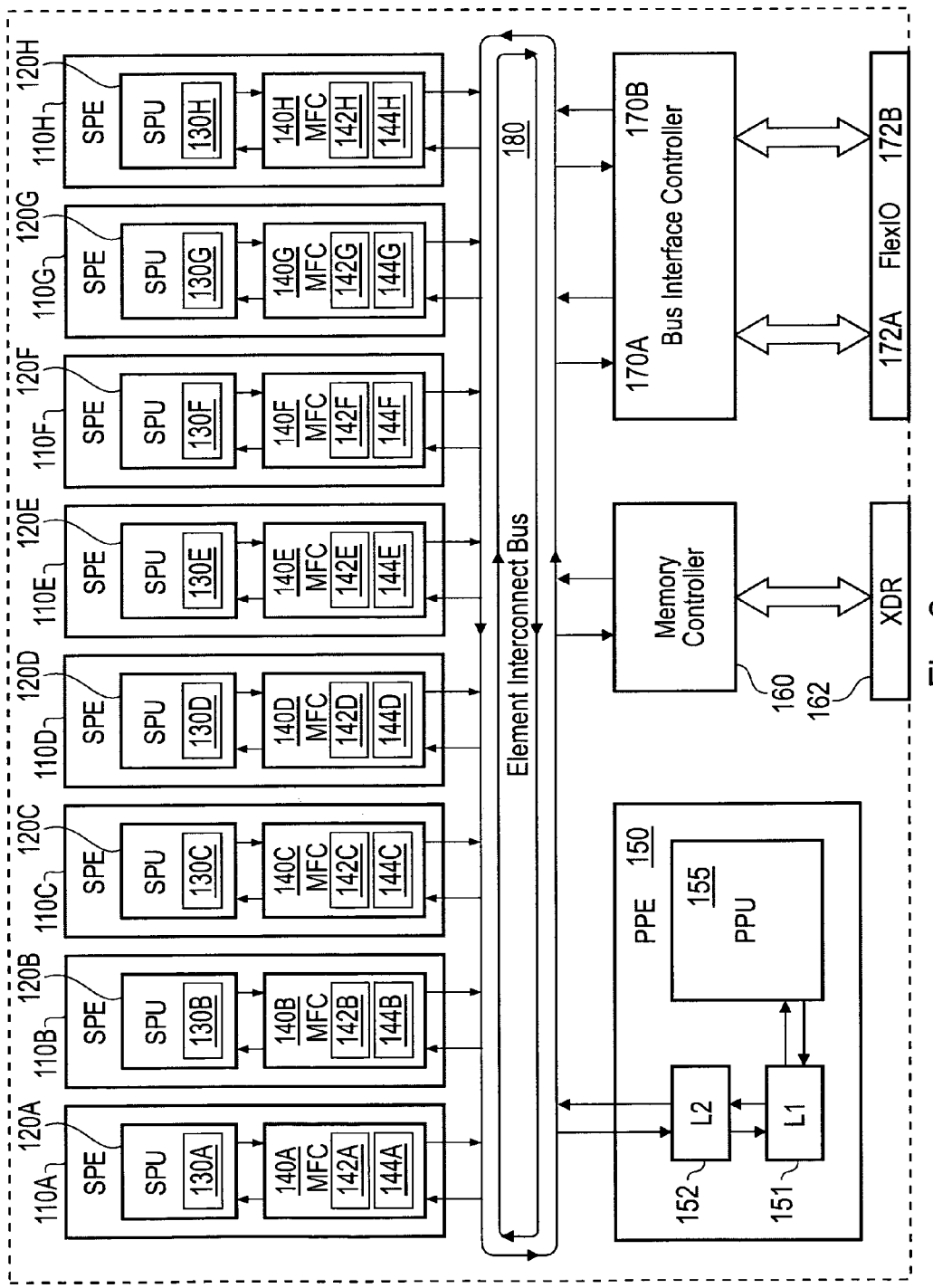
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totalling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
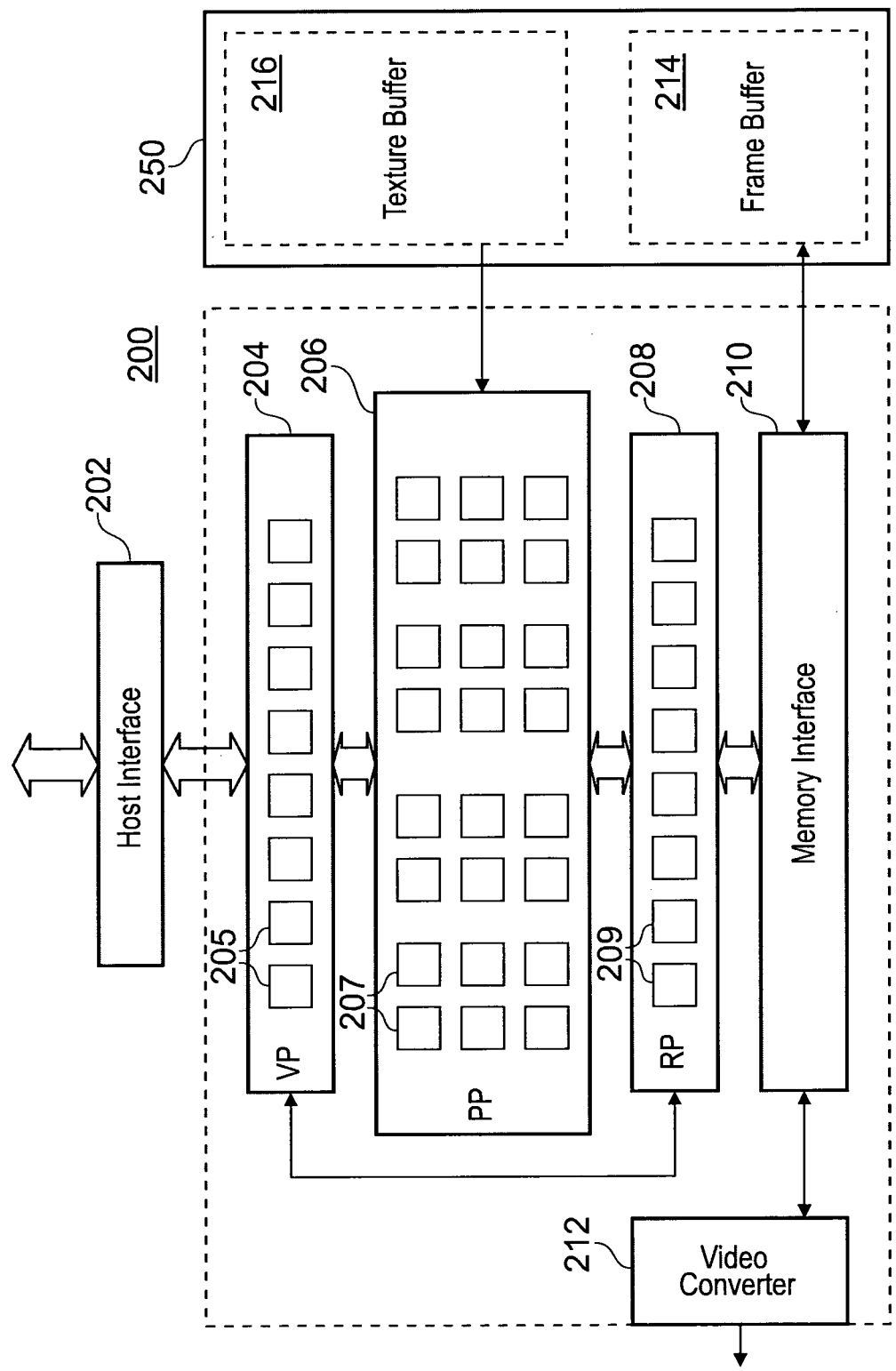
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Exemplary embodiments in which an augmented reality marker is used to calibrate a real world space so that augmented reality images may be generated will now be described with reference to FIGS. 4 to 8.

Figure 4:
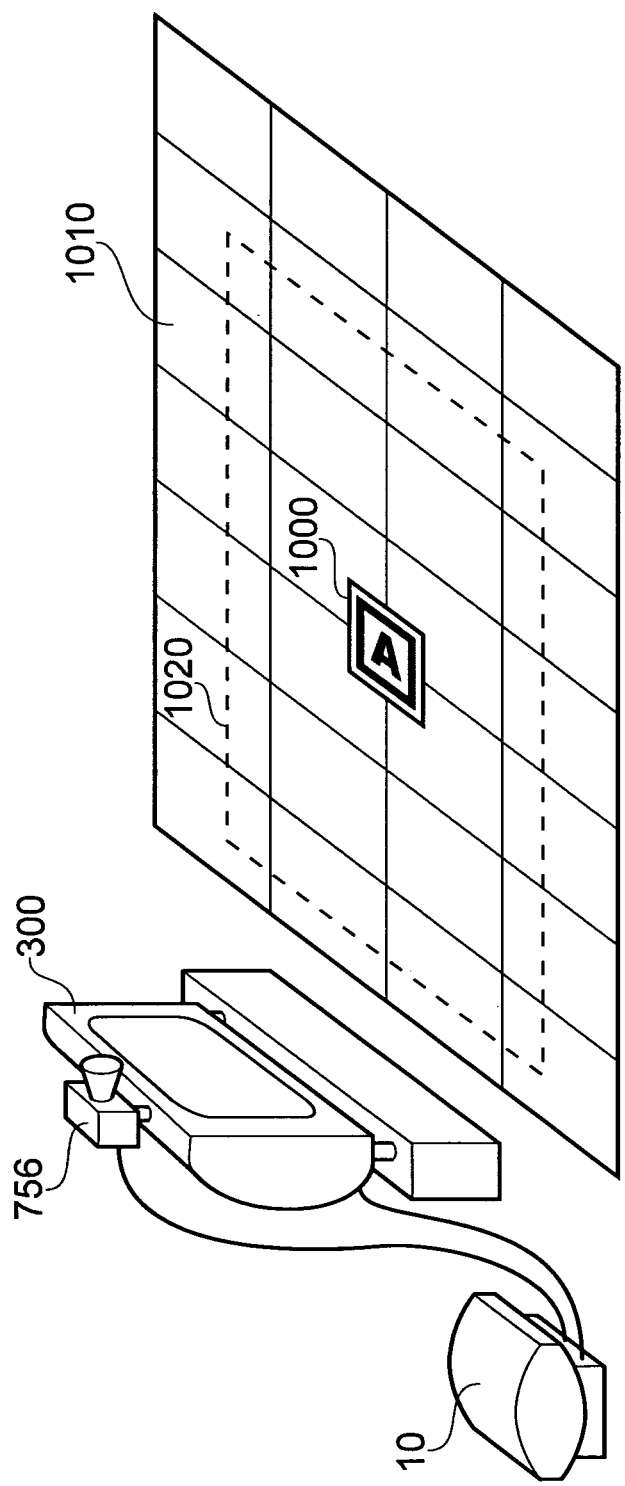
FIG. 4 is a schematic diagram of an arrangement of an entertainment system with respect to an augmented reality marker in accordance with an embodiment of the present invention.

FIG. 4 shows a schematic diagram of an entertainment system arranged to detect an augmented reality marker so that a user may interact with a video game. In the embodiments described below, the entertainment system is the same as that described above with reference to FIGS. 1 to 3. However, it will be appreciated that any suitable entertainment system could be used.

In particular, FIG. 4 shows the entertainment device 10, which is operably connected to the video camera 756 and the display and sound output device 300. Other elements of the entertainment system such as the game controller 751 have been omitted from FIG. 4 for the sake of clarity in understanding the drawing. In embodiments of the present invention, the video camera 756 is arranged to capture images of an augmented reality marker 1000. The detection of the augmented reality marker 1000 may then be used to generate a virtual image plane 1010 which relates to a real surface upon which the augmented reality marker 1000 is placed. The cell processor 100 can then generate an interaction area 1020 (indicated by the dashed line in FIG. 4). The interaction area is an area of the captured images within which virtual images may be generated and combined with the captured video images so that a user may interact with the virtual images. The interaction area will be described in more detail later below.

In embodiments of the present invention, the interaction area 1020 allows a user to interact with, for example, a virtual pet, which may be displayed combined with images of the real environment. For example, the virtual pet may displayed such that it appears to walk or run around on the virtual image plane 1010 within the interaction area 1020. This provides a user with images which make it appear as if the virtual pet is actually on the surface upon which the augmented reality marker 100 was placed.

The way in which this functionality is achieved is described below.

In order for a virtual reality object, such as a virtual pet, to be combined with real images in such a way as to be believable to a user, the position of the video camera 756 and the images captured by the video camera 756 must be calibrated in such a way as to allow virtual images to be rendered so that they correspond to a real surface in, for example, a user's living room. Once this has been done, the virtual pet may be rendered in such a way as to make it appear to move around on that surface. For example, the camera can be calibrated so that the virtual image plane 1010 corresponds to a tabletop in the user's living room. The virtual pet can then be rendered such that it appears to run around on the tabletop, giving the illusion to the user that the pet is in the user's room.

Accordingly, embodiments of the invention allow the virtual image plane 1010 to be calibrated from the position of the augmented reality marker 1000 on a real surface (such as the tabletop). To achieve this, the user places the augmented reality marker 1000 on a suitable surface so that the augmented reality marker 1000 is within a field of view of the video camera 756. The cell processor 100 then generates the virtual image plane 1010 accordingly.

In some embodiments, this calibration process may be carried out at the start of a game, for example by a user placing the augmented reality marker 1000 on a surface to be calibrated in response to an on-screen prompt generated by the cell processor 100. In other embodiments, the calibration may be carried out in response to a user selection via a suitable user interface (for example a game controller 751) indicating that calibration of the virtual image plane 1010 should be carried out. However, it will be appreciated that the calibration could be carried out at any suitable point in the game.

The way in which the virtual image plane is generated will now be described.

Figure 5:
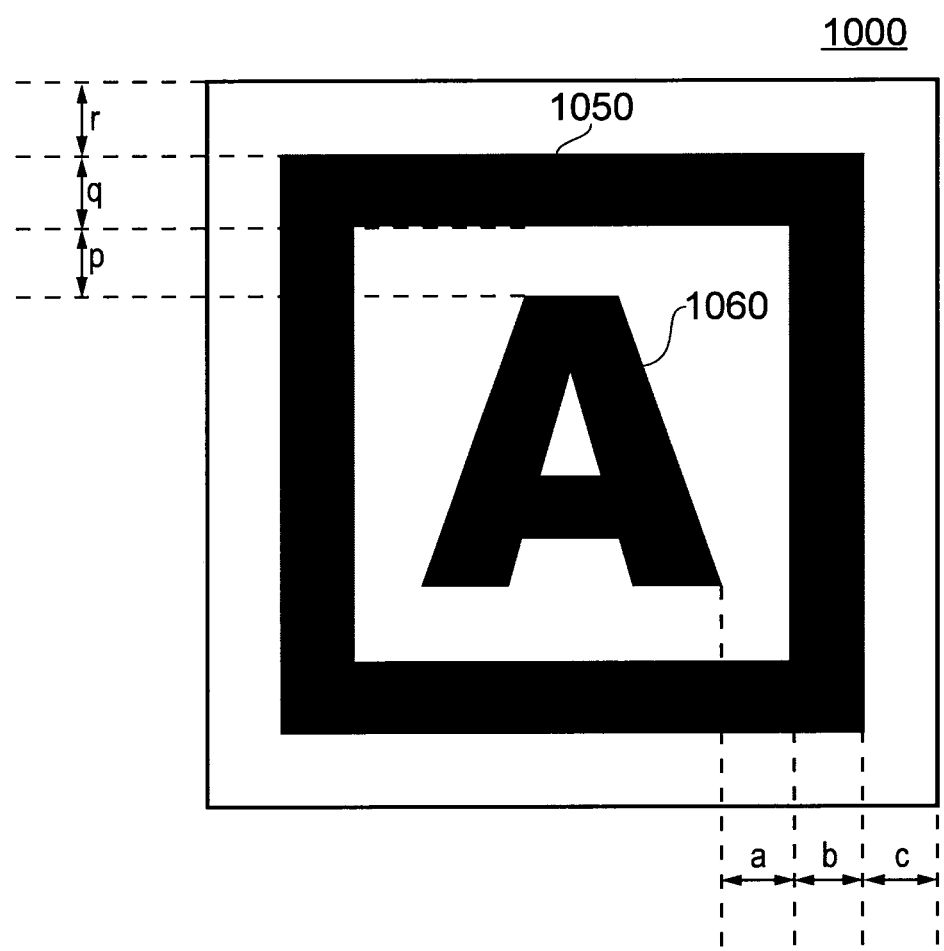
FIG. 5 is a schematic diagram of an example of an augmented reality marker in accordance with an embodiment of the present invention.

FIG. 5 shows an example of an augmented reality marker 1000 which may be used to calibrate the virtual image plane 1010 in accordance with embodiments of the present invention.

Figure 7:
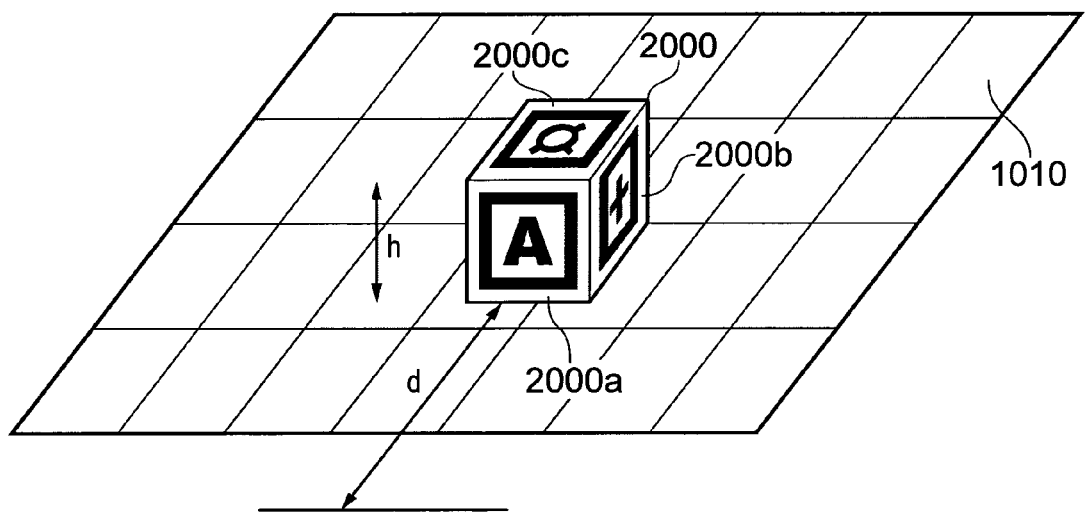
FIG. 7 is a schematic diagram of an interaction area and two augmented reality markers in accordance with an embodiment of the present invention.

The augmented reality marker 1000 comprises an image of a square 1050 together with an alphanumeric character such as the letter "A" 1060, although it will be appreciated that other symbols or patterns may be used. The augmented reality marker 1000 shown in FIG. 5 is two-dimensional although it will be appreciated that such markers may be applied to a three dimensional object, such as is as seen in FIG. 7.

During calibration, the cell processor 100 detects the augmented reality marker 1000 by analysing the images captured by the video camera 756. The cell processor 100 applies an image threshold to the captured images so as to generate a binary black and white image. The cell processor 100 then detects pixel regions which are likely to correspond to the square 1050 (also referred to as a "quad"), using known techniques such as edge following and template matching. Those regions of an analysed image which are detected by the cell processor 100 as comprising quads are then analysed using known techniques to detect whether there is an alphanumeric character e.g. the letter A 1060 within the square 1050.

The cell processor 100 then calculates a probability associated with each image region that is detected of comprising an alphanumeric character within a quad. The cell processor then detects which image region has the highest probability and labels that region as corresponding to the augmented reality marker 1000. The position of the augmented reality marker 1000 may then be used as a reference point about which the virtual image plane 1010 and the interaction area 1020 may be defined.

In the example augmented reality marker shown in FIG. 5, a distance (denoted "a" in FIG. 5) between the alphanumeric character A 1060 and the inside of the quad 1050 is substantially the same as that of a thickness (denoted "b" in FIG. 5) of the quad 1050 and a distance (denoted "c" in FIG. 5) between the outside of the quad 105 and an outside edge of the marker 1000. Additionally, a distance (denoted "p" in FIG. 5) between the alphanumeric character A 1060 and the inside of the quad 1050 is substantially the same as that of a thickness (denoted "q" in FIG. 5) of the quad 1050 and a distance (denoted "r" in FIG. 5) between the outside of the quad 105 and an outside edge of the marker 1000. In other words, in an embodiment, a=b=c=p=q=r. This assists the cell processor 100 in detecting the marker because the marker 1000 can be split up into a grid of 5 by 5 sub regions which may be analysed individually by the cell processor 100 so as to detect a quad together with an alphanumeric character or other symbol or pattern.

However, in most arrangements, such as the one shown in FIG. 4, the optical axis of the video camera 756 will not be perpendicular to a surface upon which the augmented reality marker 1000 is placed. Accordingly, the captured image of the augmented reality marker 1000 is likely to be distorted by perspective. To address this, when detection of quads is carried out by the cell processor 100, the cell processor 100 is also operable to detect rotational, skew and trapezoidal transforms of the augmented reality marker 1000 using known techniques.

Once the augmented reality marker 1000 has been detected, the distortion of the image of the augmented reality marker 1000 may then be advantageously analysed to detect the surface (for example, a tabletop) upon which the augmented reality marker 1000 is placed. Assuming that the surface upon which the augmented reality marker 1000 is placed is a substantially planar surface and that the marker is arranged to be substantially co-planar with the surface, then the virtual image plane 1010 may be generated accordingly by mapping the detected distortion of the marker 1000 to the surface.

In an embodiment, a representation of the augmented reality marker 1000 including for example the shape and size of the marker 1000 are preloaded into the XDRAM 500 from a suitable recording medium such as a Blu-ray® disc 440 or from the HDD 400. The cell processor 100 is then operable to calculate a transform which corresponds to transforming the marker 1000 so that it is a predetermined distance away from the video camera 756 and perpendicular to the optical axis of the camera. As the marker 1000 is parallel (arranged to be substantially co-planar) to the surface upon which it is placed (at least in those circumstances where the surface is substantially planar), the resultant calculated transform may be used to calculate coordinates which define the virtual image plane 1010. However, it will be appreciated that other suitable methods for generating the virtual image plane 1010 from the detection of the marker could be used.

In an embodiment, only one image frame is used to calibrate the virtual image plane as described above. This may be performed in response to a selection by the user that calibration of the image plane 1010 is to be carried out. Alternatively, the calibration of the virtual image plane 1020 to the actual surface upon which the marker 1000 is placed may be performed automatically on loading a game. In other embodiments, the virtual image plane 1020 is calibrated by calculating the mean average of coordinates relating to virtual image planes each generated from respective images within a sequence of video images. However, it will be appreciated that the virtual image plane may be calibrated at any other suitable point in the game or in response to any other suitable user input.

Once calibration of the virtual image plane has been carried out, a user can then remove the virtual reality marker 1000 from the field of view of the video camera 756. By using an augmented reality marker to calibrate a virtual image plane, calibration of the plane may be carried out quickly and efficiently so that the virtual image plane can be used during generation of augmented reality images.

In embodiments of the present invention, a virtual pet may be generated by the system unit 10 so that the pet can be displayed on the display and sound output device 300 and appear combined with the real images.

In one embodiment, the virtual image plane 1010 may be generated by the cell processor 100 so that the virtual image plane 1010 extends throughout the field of view of the video camera 756. However, if the pet is caused to move around in the virtual image plane 1010, either in response to user input or in response to instructions generated by the cell processor 100, other real objects within the images captured by the video camera 756 may overlap with a generated position of the virtual pet, thereby detrimentally affecting the illusion of a virtual pet in a real environment.

For example, this may occur where the planar surface upon which the augmented reality marker 1000 has been placed is a floor of a user's living room. In this situation, there may be furniture around the edge of the room which is also within the field of view of the video camera 756 which might affect the generation of the augmented reality images. To address this problem, the cell processor 100 is operable to generate an interaction area which is a region of the captured images in which the virtual reality object may be displayed for interaction with the user. The interaction area 1020 is shown as the dashed line in FIG. 4. In embodiments of the present invention, movements of the virtual pet are restricted so that the pet can only move within the virtual interaction area 1020. Accordingly, movement of the virtual pet is less likely to cause the virtual pet to be displayed in an area of the screen 305 which corresponds to other real world objects.

The user may interact with the virtual pet via any suitable user interface such as the game controller 751. Preferably, the user interacts with the virtual pet via motion, images of which are captured by the video camera 756. The cell processor 100 analyses the captured images for motion occurring near the pet using known techniques, and modifies and controls the behaviour of the virtual pet accordingly. A user can also interact with other virtual objects generated by the cell processor 100 in a similar way.

In embodiments of the present invention, the interaction area 1020 is automatically set by the cell processor 100 to be centred on the detected augmented reality marker 1000 and to be 50 percent of the full pixel area of the images captured by the video camera 756. In other embodiments, the interaction area 1020 is set by the cell processor 100 to correspond to 50 percent of the full pixel area of the images captured by the video camera 756 and to be a lower half of the full pixel area. However, it will be appreciated that any other suitable percentage of the pixel area or location of the selected area with respect to the marker 1000 may be used.

Additionally, a user may select the shape of the interaction area 1020 by using a suitable user interface and an on screen selection menu generated by the cell processor 100. For example, as shown in FIG. 4, the interaction area 1020 could be rectangular with the centre of the rectangle corresponding to the position of the augmented reality marker 1000 which was used to calibrate the virtual image plane. In some embodiments, the shape of the interaction area 1020 is substantially trapezoidal in the virtual image plane so that when the virtual image plane is mapped to a plane parallel to an image plane of the camera 756, the interaction area 1020 appears to be rectangular. However, it will be appreciated that other shapes of interaction area may be used and that the interaction area need not be centred on the virtual reality marker 1000.

Alternatively, the interaction area is generated by the cell processor 100 so that the interaction area corresponds to detected interaction area pixels. Interaction area pixels are those which surround the detected augmented reality marker 1000 and are colour matched to within a predetermined colour threshold with respect to a detected colour of one or more pixels adjacent to pixels which correspond to the augmented reality marker 1000. The cell processor 100 detects the interaction area pixels by detecting an average colour of pixels which are adjacent to those corresponding to the augmented reality marker 1000. The cell processor 100 then detects which pixels are contiguous with the pixels adjacent to the augmented reality marker 1000 and are within a predetermined colour threshold of the pixels adjacent to the augmented reality marker 1000 so as to generate the interaction area pixels. A tolerance to small areas of divergent colour may be allowed to account for marks, etc., in the surface.

An embodiment in which two augmented reality markers are used to define the interaction area 1020 will now be described with reference to FIG. 6.

Figure 6:
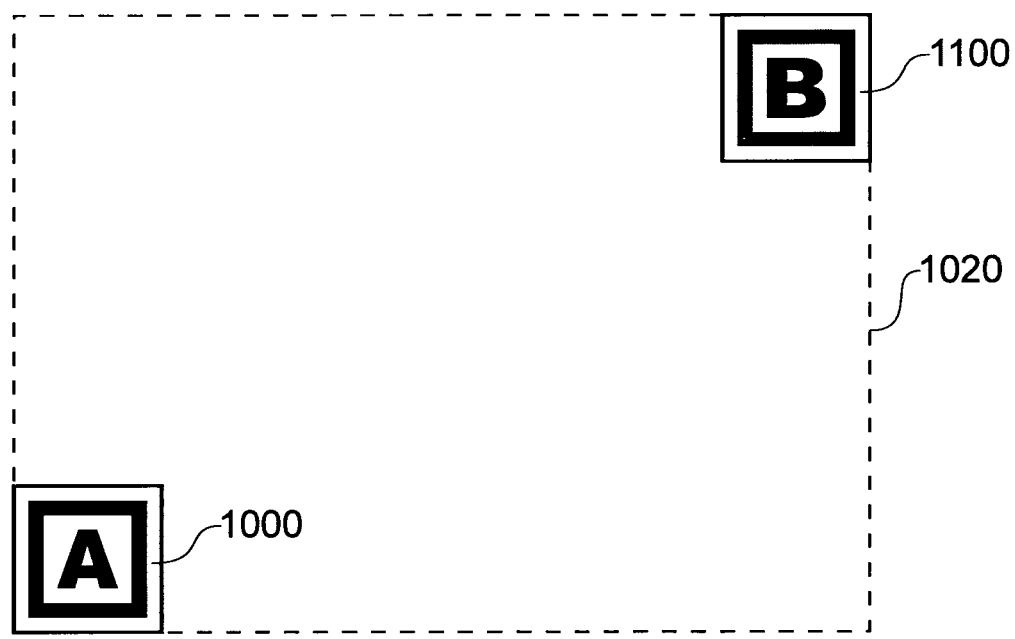
FIG. 6 is a schematic diagram of a three-dimensional augmented reality marker in accordance with an embodiment of the present invention.

FIG. 6 shows augmented reality marker 1000 together with another augmented reality marker 1100. In this embodiment, the cell processor 100 is operable to detect the augmented reality marker A 1000 and the augmented reality marker B 1100 and generate the interaction area so that at least part of a perimeter of the interaction area 1020 corresponds with the detected augmented reality markers 1000 and 1100. For example, the augmented reality markers 1000 and 1100 may indicate the corners of a rectangle as shown in FIG. 6. In this way, a user may position the augmented reality markers 1000 and 1100 so that they delineate the corners of the interaction area within a physical space such as the floor of a living room. Additionally, the cell processor 100 can detect the relative size and any image distortion of the two markers using known techniques so as to map the virtual image plane 1010 (not shown in FIG. 6) to the surface upon which the markers are placed.

It will be appreciated that the augmented reality markers 1000 and 1100 may be used to indicate the perimeter an interaction area having a shape which is different from that of the interaction area 1020 shown in FIG. 6. Accordingly, it will be appreciated that the shape of the interaction area 1020 need not be limited to a rectangle and that other shapes such as a square, a circle and a triangle and the like may be used. Additionally, any number of augmented reality markers may be used to indicate the perimeter of the interaction area 1020. However, an increase in the number of augmented reality markers may increase the amount of processing resources needed to detect the markers and therefore generate the interaction area.

An embodiment in which a three dimensional augmented reality marker may be used will now be described with reference to FIG. 7.

FIG. 7 shows a three dimensional augmented reality marker 2000 which may be used to generate the virtual image plane 1010 and/or the interaction area 1020. In the embodiment shown in FIG. 7, the three dimensional virtual reality marker 2000 is a cube comprising a plurality of marker faces 2000*a*, 2000*b* and 2000*c*, each of which comprises a quad in which there is a shape indicating the relative orientation of that marker face. For example, the marker face 2000*a* comprises a quad in which an alphanumeric character "A" is shown. The marker faces 2000*b* and 2000*c* show two different non-alphanumeric characters. However, it will be appreciated that other three dimensional shapes may be used for the virtual augmented reality marker 2000 and that the images on the marker need not be planar in nature.

The use of a three-dimensional augmented reality marker addresses a problem which may occur if the optical axis of the camera forms an acute angle with a line parallel to the surface upon which the augmented reality marker is placed. In this case, distortions of a two dimensional marker placed on the surface may be so great as to mean that detection by the cell processor 100 of the augmented reality marker 1000 becomes unlikely or impossible. Even if detection of the marker is possible, it may not be possible to detect the distortion with sufficient accuracy to use the marker to calibrate the virtual image plane.

However, by using a three dimensional augmented reality marker such as the augmented reality marker 2000, at least part of the marker is likely to be substantially perpendicular to the optical axis of the video camera 756. This advantageously increases the likelihood that the marker will be detected. In the example shown in FIG. 7, the cell processor 100 is likely to detect the marker face 2000*a* and assign that region of the image as corresponding to the marker 2000. Given a height h of the augmented reality marker 2000 (which may be predetermined within software, loaded from a suitable storage medium, input by a user and the like), the cell processor 100 can then detect the distortion of marker faces 2000*b* and 2000*c* so as to generate the virtual image plane 1010. The virtual image plane and the interaction area 1020 are generated as described above with reference to FIGS. 4 to 6.

In embodiments of the invention, a user may interact with, for example, the virtual pet, by moving their hand near the virtual pet. To achieve this functionality, the cell processor 100 causes an image in which there are no moving objects (for example when calibrating the virtual image plane using the augmented reality marker 1000 or the augmented reality marker 2000) to be stored to the XDRAM 500 of the HDD 400 and assign this image as a background image. Subsequent image frames are then analysed by the cell processor 100 to detect changes in pixel values with respect to the background image. Any pixel values which change with respect to the background image are labelled as foreground pixels and are likely to correspond to motion by, for example, a user. The cell processor 100 then carries out known object detection and tracking techniques to assign an object type to respective foreground pixels. In an embodiment, each interaction object may interact with the virtual pet in a different way.

For example, a rapid change in pixel value above the pet, but in close proximity to the pet, may correspond to a user mimicking a tickling motion and therefore the cell processor 100 can render the pet so that it reacts accordingly. However, it will be appreciated that any other forms of interaction may be used and that other virtual reality objects such as footballs, vehicles, tools and the like could be simulated.

Referring now to FIG. 8, a user is able to input a blueprint for an object that can occupy the augmented reality environment (for example within the interaction area) and can interact with the pet and other objects, in the following manner.

The user takes a piece of paper or a wipeable whiteboard, and draws an object 3010 upon it. The user then notifies the entertainment device that they have such a drawing, for example by selecting a menu item or pressing an assigned key on the controller. At this point the entertainment device outputs a video image to the display that indicates the desired scale and orientation of the drawing for presentation to the video camera, for example by overlaying a frame of a certain size and orientation in front of the captured video feed from the camera.

The user positions the drawing so as to occupy this frame, and a capture of the user's drawn image is taken. The captured drawing is analysed using known techniques to characterise the separate shapes it contains.

The user's drawn object is assumed to be representative of an archetypal object supported by the entertainment device. In an embodiment of the present invention, the entertainment device supports one or more archetypal objects; these may include a car, a flower, or a bird. Other objects will be apparent to the person skilled in the art.

Figure 8A:
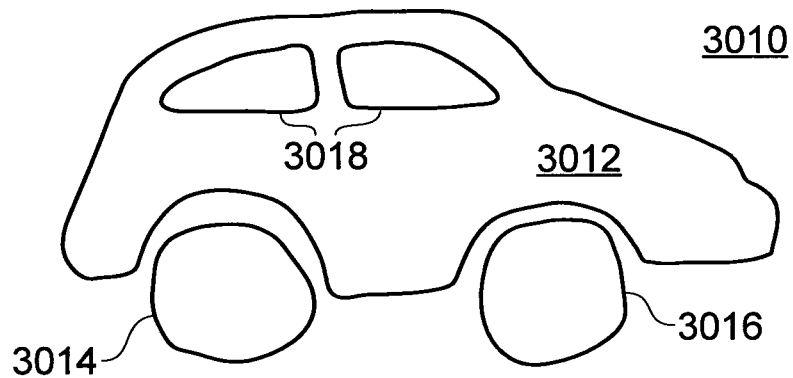
FIG. 8A represents a user's drawing of a car.
Figure 8B:
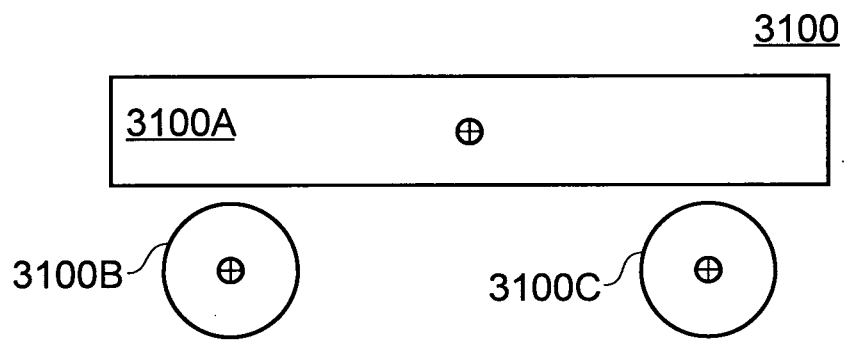
FIG. 8B is a schematic diagram of an archetypal model of a car supported by the entertainment device.
Figure 8C:
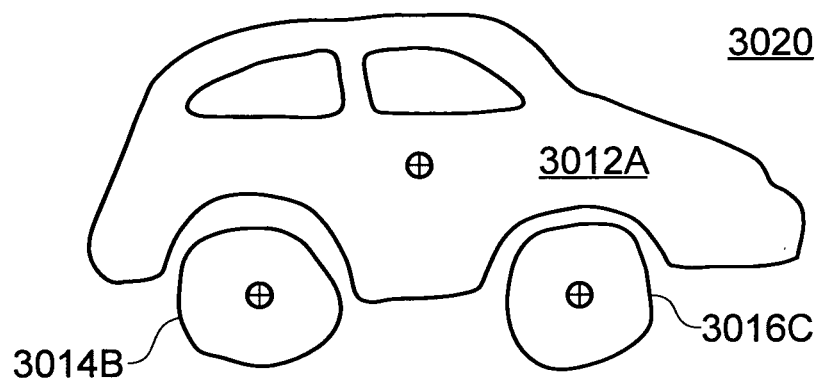
FIG. 8C is a schematic diagram of a car template based upon the users drawing of a car as interpreted with reference to the archetypal model of a car.

In the example of FIGS. 8A-C, the drawing is of a car, comprising three hand-drawn principal shapes; a upper, larger shape 3012, and two smaller shapes 3014, 3016.

The entertainment device uses rules or heuristics to determine the intended object. In this example, referring to FIG. 8B a large shape 3100A substantially above two smaller shapes 3100B, 3100C that are laterally spaced apart corresponds to the archetypal model of a car. Other examples (not shown) include that a large, thin elongate body surmounted by smaller elongate bodies whose major axes each intersect a notional region around the top of the large elongate body is a flower. Likewise a large elongate central body flanked by similarly sized elongate bodies with major axes roughly normal to it is a bird or an aeroplane, and so on.

Alternatively, the user can select in advance from a menu which archetypal object they intend their drawing to convey.

The entertainment device then (or as part of the model determination process above) identifies how the shapes in the drawing correspond to components of the relevant archetype.

Referring to FIG. 8C, in the present example, shape 3012 corresponds to shape 3100A and shapes 3014 and 3016 correspond to shapes 3100B and C (The smaller shapes within the car body 3018 can be interpreted either as cut-outs or as decoration), and are hence denoted 3012A, 3014B and 3014C respectively.

The determination of shape correspondence can similarly use rules or heuristics. For example, for a car the largest shape should have the highest centroid (denoted by a '⊕' in the figures) and corresponds to the car body. The two smaller shapes should have lower centroids (optionally within a vertical tolerance of each other and optionally with a minimum lateral separation) and correspond to the wheels.

The parameters of the underlying archetypal device are then adapted to reflect the proportions of the user's drawing (e.g. calculating centres of mass and positioning wheel axes accordingly, and the like), to generate a template version of the user's car 3020 based upon the appearance of the user's drawing and correspondingly modified properties of the archetypal object.

Figure 9:
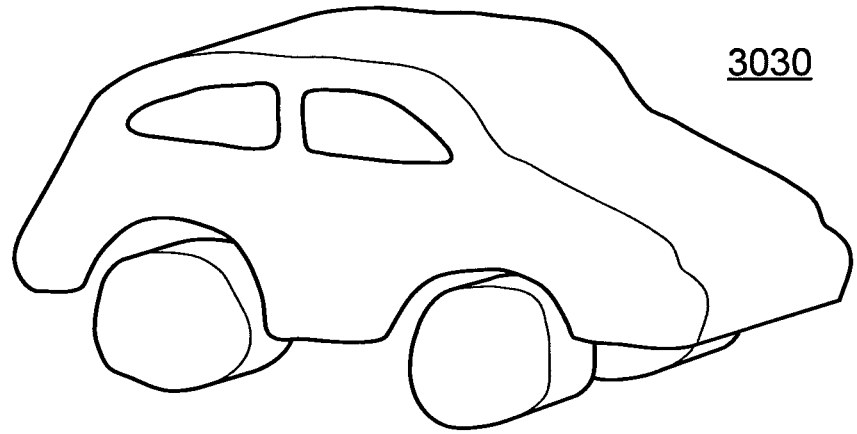
FIG. 9 is a schematic diagram of a 3D model of the car based upon construction rules associated with the archetypal model of the car.

Referring now to FIG. 9, the entertainment device then uses the user's hand drawn shapes to define polygons for a three dimensional model 3030 of the template 3020.

To do this, a set of transformational rules specific to the archetypal object are applied. In the case of the car, the main body is extruded into the third dimension, for example by an extent proportional to the length of the drawn object. Meanwhile, the front and rear wheels (front and rear may be determined by a simple left/right convention, for example, or according to the archetype) are offset in the third dimension with respect to the main body and extruded to a much smaller degree. In addition, a second pair of wheels, not depicted in the user's original drawing, are generated by copying the front and rear wheels, and are offset in the third dimension to the far side of the car.

In this way, a two-dimensional physical drawing has been used as the template for building a three dimensional virtual object clearly resembling the drawing, with different elements or components of the drawing undergoing different extrusions, duplications or other transformations in 3D according to their identified role with respect to components of the associated archetypal object.

Thus more generally, a three dimensional virtual model of the drawing in the captured image is generated using a set of rules specific to the archetypal model with which the drawing is associated, with each component of the three dimensional model generated from a component of the archetype having the appearance of the corresponding drawn shape in the user's original picture.

Thus for example in the case of a flower, when transformed into three dimensions the petals of the flower can be rotated from the same plane as the stalk into a plane normal to it and extending in the third dimension, so that the petals sit on top of the stalk in the x-z plane whilst the stalk remains primarily in the x-y plane.

Likewise, for a bird the central body can be made a solid of rotation whilst the flanking bodies remain flat. In this case, further analysis of the image could allow, for example, the solid of rotation to end at a narrow point in the central body and then taper flat toward the end, thereby forming the shape of the tail. In addition at the opposite end of the central body, the resulting solid of rotation could be bent downwards to form a curved beak.

It will be appreciated by a person skilled in the art that such additional cosmetic changes may be applicable to each model; for example, a random slight downward vertical curvature may be applied to each petal of the flower or bird wing, or for the car a front windscreen may be added having the same vertical extent as drawn window shapes 3018 in the original drawing, or headlights and brake lights can be added, etc. Other possible transformations of specific drawn shapes include scaling, rotation, and deformation, and creating a shell of rotation (rather than a solid), for example to create an umbrella from a drawn arc. Such rotations may employ interpolation between beginning and end to ensure that the resulting body appears continuous.

A mesh of polygons is calculated to approximate the resulting bodies in three dimensions and one or more textures are applied, generally pre-selected for relevancy to the nature of the archetypal object.

Optionally, the archetypal object also includes information to allow a dynamic modelling of physics between the components of the object and/or between the object and the environment. Thus for example a spring or damped spring may connect the wheels or notional axles of the car to the car body. These connections are dependent upon the archetype parameters as modified in the template version of the object and are then propagated and/or duplicated in the 3D version of the object as applicable.

Once completed, the model can be controlled by the user within the augmented reality environment. For example, the car can be controlled like a conventional virtual car within the interaction area, and in an embodiment uses physics by applying torque to the front or rear wheels, causing them to rotate and move over the virtual surface of the interactive area. Due to their likely non-circular nature (being based on a user's drawing), they will therefore convey varying forces through their spring connections to the main body of the car, causing it to move in an amusing manner as it drives. The front wheels can be turned to turn the car.

Similar control may be exerted over a model of a bird, or other suitable supported archetypes.

In this way, a controllable 3D virtual object is created from a physical drawing.

It will be appreciated that the degree of physical modelling employed may vary between models, and need not conform to realistic physical constants.

The above process of model creation may be conveyed to the user by the pet. For example, the pet can be shown supervising a replication of the drawing in which the identified shapes are indicated either by different colours or by the pet gesturing to them. The shapes may then be shown to be cut out, and the extrusion process or other means of converting elements of the drawing into 3D as described above may be animated, again under the pet's apparent supervision.

In this way the pet is shown to be involved in the creation of the virtual object.

The pet may then have one or more interactive games or activities that it can perform with such a virtual object, typically associated with the underlying archetype of the virtual object. For example, the pet may sniff or rub up against a flower, or may stalk a bird or express surprise when it flies near.

In the case of the car, a game of chase may be played in which the pet and the user take turns chasing each other; the user chases the pet with the car, and once they succeed in pushing the pet with the car, the pet (after a brief moment) chases the car in turn. This may continue for several rounds. Optionally, after a predetermined number of rounds, if the pet succeeds in pushing the car back then the car falls apart and is removed from play.

To facilitate re-use and to encourage user investment in the drawing process, captured images can be saved to form a gallery from which virtual objects can be repeatedly created.

Figure 10:
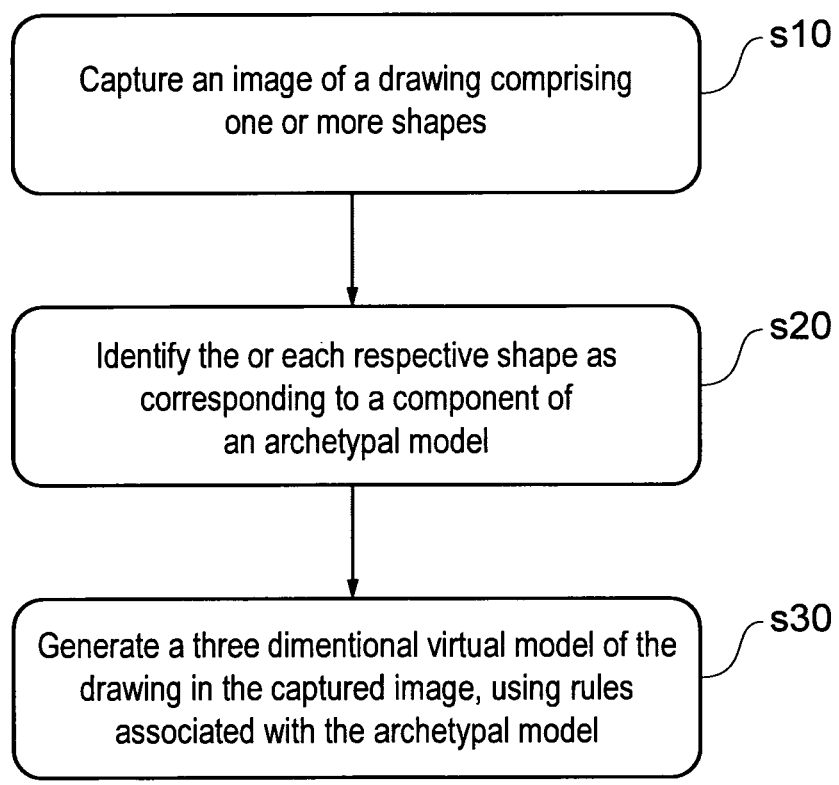
FIG. 10 is a flow diagram of a method of interaction for an augmented reality environment.

Referring to FIG. 10, a method of interaction for an augmented reality environment comprises:

in a first step s10, capturing an image of a drawn picture comprising one or more drawn shapes;

in a second step s20, identifying the or each respective drawn shape as corresponding to a component of an archetypal model; and in a third step s30, generating a three dimensional virtual model representing the archetypal model using rules associated with the archetypal model, wherein components of the three dimensional virtual model generated from components of the archetypal model corresponding to the or each respective drawn shape have the appearance of the or each respective drawn shape.

It will be apparent to a person skilled in the art that variations in the above method corresponding to operation of the various embodiments of the apparatus described above are considered within the scope of the present invention, including but not limited to:

the rules associated with the archetypal model including that a shape from the image of the drawing corresponding to a predetermined component of the archetypal model is duplicated in the third dimension;

the rules associated with the archetypal model including one or more selected from the list consisting of that different shapes corresponding to different components of the archetypal model are extruded into the third dimension by differing extents;

that a shape from the image of the drawing corresponding to a predetermined component of the archetypal model is used to generate a solid of rotation; and that a shape from the image of the drawing corresponding to a predetermined component of the archetypal model is rotated into a plane orthogonal to the plane originally occupied by the shape;

that the resulting three dimensional virtual model is combined with a captured video feed to form an augmented reality environment;

that the resulting three dimensional virtual model is controllable by a user; and the resulting three dimensional virtual model interacts with a computer controlled avatar such as the pet, in a manner determined by the underlying archetypal model.

It will be appreciated that the above described techniques may be combined as appropriate. For example, where more than one marker is used to define the virtual image plane and or the interaction area, one marker could be a three dimensional marker as described above with reference to FIG. 7, whilst other markers could be two dimensional. Similarly, in principle more than one drawing may be converted into an object at any one time, resulting in a plurality of such objects interacting with the environment and pet.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a computer program product or similar object of manufacture comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

In conclusion, although a variety of embodiments have been described herein, these are provided by way of example only, and many variations and modifications on such embodiments will be apparent to the skilled person and fall within the scope of the present invention, which is defined by the appended claims and their equivalents.

The invention claimed is:

1. A method of interaction for an augmented reality environment, comprising the steps of:
   capturing an image of a drawn picture comprising a plurality of drawn shapes;
   identifying an archetypal model corresponding to said drawn picture and identifying respective components of said archetypal model corresponding to respective drawn shapes of the plurality of drawn shapes in said drawn picture; and
   generating a three dimensional virtual model from said respective drawn shapes corresponding to respective components of said identified archetypal model using generation rules associated with said identified archetypal model, wherein components of the three dimensional virtual model corresponding to respective components of said identified archetypal model have the shape of the respective corresponding drawn shape.

2. A method according to claim 1, in which said generation rules associated with said identified archetypal model include that a component corresponding to a shape from the image of the drawing corresponding in turn to a predetermined component of the identified archetypal model is duplicated and offset in the third dimension to produce two separate components of the three dimensional virtual model corresponding to the same respective drawn shape.

3. A method according to claim 1, in which said generation rules associated with the identified archetypal model include one or more selected from the list consisting of:
   i. that different shapes corresponding to different components of the archetypal model are extruded into the third dimension by differing extents;
   ii. that a shape from the image of the drawing corresponding to a predetermined component of the archetypal model is used to generate a solid of rotation; and
   iii. that a shape from the image of the drawing corresponding to a predetermined component of the archetypal model is rotated into a plane orthogonal to the plane originally occupied by the shape.

4. A method according to claim 1, in which the resulting three dimensional virtual model is combined with a captured video feed to form an augmented reality environment.

5. A method according to claim 1, in which the resulting three dimensional virtual model is controllable by a user.

6. A method according to claim 1, in which the resulting three dimensional virtual model interacts with a computer controlled avatar.

7. A method according to claim 6, in which the three dimensional virtual model interacts in a manner dependent upon the archetypal model to which the three dimensional virtual model corresponds.

8. A non-transitory computer-readable storage medium on which computer readable instructions of a program are stored, the instructions, when executed by a processor, cause the processor to perform a method of interaction for an augmented reality environment, the method comprising:
   capturing an image of a drawn picture comprising a plurality of drawn shapes;
   identifying an archetypal model corresponding to said drawn picture and identifying respective components of said archetypal model corresponding to respective drawn shapes of the plurality of drawn shapes in said drawn picture; and
   generating a three dimensional virtual model from said respective drawn shapes corresponding to respective components of said identified archetypal model using generation rules associated with said identified archetypal model, wherein components of the three dimensional virtual model corresponding to respective components of said identified archetypal model have the shape of the respective corresponding drawn shape.

9. An entertainment device, comprising:
   a video input operable to receive video data;
   an image capturer operable to capture an image of a drawn picture comprising a plurality of shapes from said video data;
   a shape identifier operable to identify an archetypal model corresponding to said drawn picture and identifying respective components of the identified archetypal model corresponding to respective drawn shapes of the plurality of drawn shapes in said drawn picture; and
   a three dimensional modeller operable to generate a three dimensional virtual model from said respective drawn shapes corresponding to respective components of said identified archetypal model using generation rules associated with said identified archetypal model, wherein components of said three dimensional virtual model corresponding to components of said identified archetypal model have the shape of said respective corresponding drawn shape.

10. An entertainment device according to claim 9, in which said generation rules associated with said identified archetypal model include that a component corresponding to a shape from said image of the drawing corresponding to a predetermined component of said identified archetypal model is duplicated and offset in the third dimension to produce two separate components of said three dimensional virtual model corresponding to the same respective drawn shape.

11. An entertainment device according to claim 9, in which said generation rules associated with the archetypal model include one or more selected from the list consisting of:
   i. that different shapes corresponding to different components of the archetypal model are extruded into the third dimension by differing extents;
   ii. that a shape from the image of the drawing corresponding to a predetermined component of the archetypal model is used to generate a solid of rotation; and
   iii. that a shape from the image of the drawing corresponding to a predetermined component of the archetypal model is rotated into a plane orthogonal to the plane originally occupied by the shape.

12. An entertainment device according to claim 9, in which the resulting three dimensional virtual model is combined with a captured video feed to form an augmented reality environment.

13. An entertainment device according to claim 9, in which the resulting three dimensional virtual model is controllable by a user.

14. An entertainment device according to claim 9, in which the resulting three dimensional virtual model interacts with a computer controlled avatar.

15. An entertainment device according to claim 14, in which the mode of interaction is dependent upon said identified archetypal model to which said three dimensional virtual model corresponds.

* * * * *